United States Patent
Beltran Gracia et al.

(10) Patent No.: US 9,796,926 B2
(45) Date of Patent: Oct. 24, 2017

(54) REACTIVE MESOGEN BASED POLYMER PARTICLES

(71) Applicant: MERCK PATENT GMBH, Darmstadt (DE)

(72) Inventors: Eduardo Beltran Gracia, Southampton (GB); Owain Llyr Parri, Ringwood (GB)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/118,713

(22) PCT Filed: Jan. 14, 2015

(86) PCT No.: PCT/EP2015/000048
§ 371 (c)(1),
(2) Date: Aug. 12, 2016

(87) PCT Pub. No.: WO2015/120950
PCT Pub. Date: Aug. 20, 2015

(65) Prior Publication Data
US 2017/0044439 A1    Feb. 16, 2017

(30) Foreign Application Priority Data
Feb. 13, 2014 (EP) .................................... 14000508

(51) Int. Cl.
*C08F 2/00*       (2006.01)
*C08F 12/02*      (2006.01)
(Continued)

(52) U.S. Cl.
CPC ........ *C09K 19/3804* (2013.01); *C09B 69/106* (2013.01); *C09K 19/52* (2013.01);
(Continued)

(58) Field of Classification Search
CPC . C08F 220/30; C08F 2/44; C09D 5/44; C09D 11/30; C09K 19/38; C09K 19/04;
(Continued)

(56) References Cited

U.S. PATENT DOCUMENTS 5,942,030 A    8/1999   Schuhmacher et al.
6,217,792 B1   4/2001   Parri et al.
(Continued)

FOREIGN PATENT DOCUMENTS

DE    19602795 A1    7/1997
DE    19602848 A1    7/1997
(Continued)

OTHER PUBLICATIONS

International Search Report for PCT/EP2015/000048 dated Mar. 18, 2015.
(Continued)

*Primary Examiner* — William Cheung
(74) *Attorney, Agent, or Firm* — Millen White Zelano & Branigan, PC (57) ABSTRACT

This invention relates to a process for the preparation of monodisperse optical and shape anisotropic polymer particles comprising monomer units of at least one reactive mesogen, such particles per se, the use of these particles for the preparation of optical, electrooptical, electronic electrochemical, electrophotographic, electrowetting and electrophoretic displays and/or devices and security, cosmetic, decorative, and diagnostic applications, and electrophoretic fluids and displays.

30 Claims, 5 Drawing Sheets (51) Int. Cl.
*C09K 19/38* (2006.01)
*C09K 19/60* (2006.01)
*G02F 1/167* (2006.01)
*C09B 69/10* (2006.01)
*C09K 19/04* (2006.01)
*C09K 19/18* (2006.01)
*C09K 19/20* (2006.01)
*C09K 19/52* (2006.01)

(52) U.S. Cl.
CPC .............. *C09K 19/60* (2013.01); *G02F 1/167* (2013.01); *C09K 2019/0448* (2013.01); *C09K 2019/188* (2013.01); *C09K 2019/2092* (2013.01); *C09K 2019/525* (2013.01); *C09K 2019/528* (2013.01); *C09K 2219/00* (2013.01); *G02F 2001/1678* (2013.01)

(58) Field of Classification Search
CPC ......... C09K 19/60; C08J 3/12; G01N 27/447; G02F 1/167
USPC .................................................. 526/204, 346
See application file for complete search history.

(56) References Cited

U.S. PATENT DOCUMENTS

| | | | |
|---|---|---|---|
| 6,511,719 | B2 | 1/2003 | Farrand et al. |
| 6,876,427 | B2 | 4/2005 | Bowley et al. |
| 7,041,345 | B2 | 5/2006 | Kirsch et al. |
| 7,060,331 | B2 | 6/2006 | Kirsch et al. |
| 7,297,292 | B2 | 11/2007 | Hammond-Smith et al. |
| 7,298,442 | B2 | 11/2007 | Bowley et al. |
| 7,318,950 | B2 | 1/2008 | Kirsch et al. |
| 8,593,719 | B2 | 11/2013 | Farrand et al. |
| 9,109,160 | B2 | 8/2015 | Ramon-Gimenez et al. |
| 9,115,464 | B2 | 8/2015 | Greinert et al. |
| 2002/0076510 | A1 | 6/2002 | Farrand |
| 2003/0063245 | A1 | 4/2003 | Bowley et al. |
| 2003/0175445 | A1 | 9/2003 | Kirsch et al. |
| 2003/0178601 | A1 | 9/2003 | Kirsch et al. |
| 2003/0189189 | A1 | 10/2003 | Kirsch et al. |
| 2005/0140918 | A1 | 6/2005 | Bowley et al. |
| 2005/0249889 | A1 | 11/2005 | Hammond-Smith et al. |
| 2011/0204282 | A1* | 8/2011 | Yoshihara et al. ............. 252/75 |
| 2011/0306742 | A1 | 12/2011 | Farrand et al. |
| 2012/0041165 | A1 | 2/2012 | Greinert et al. |
| 2013/0208344 | A1 | 8/2013 | Farrand et al. |
| 2014/0085709 | A1 | 3/2014 | Ramon-Gimenez et al. |
| 2014/0256896 | A1 | 9/2014 | Nakata et al. |
| 2015/0166892 | A1 | 6/2015 | Gardiner et al. |
| 2015/0376421 | A1 | 12/2015 | Ramon-Gimenez et al. |

FOREIGN PATENT DOCUMENTS

| | | | |
|---|---|---|---|
| GB | 2328207 | A | 2/1999 |
| JP | H10062739 | A | 3/1998 |
| JP | 2001262144 | A | 9/2001 |
| WO | 9800428 | A1 | 1/1998 |
| WO | 0206195 | A1 | 1/2002 |
| WO | 0206196 | A1 | 1/2002 |
| WO | 0206265 | A1 | 1/2002 |
| WO | 0294805 | A1 | 4/2002 |
| WO | 0234739 | A1 | 5/2002 |
| WO | 03027761 | A1 | 4/2003 |
| WO | 2004005425 | A1 | 1/2004 |
| WO | 2009100803 | A2 | 8/2009 |
| WO | 2010089057 | A2 | 8/2010 |
| WO | 2010089060 | A2 | 8/2010 |
| WO | 2012019704 | A1 | 2/2012 |
| WO | 2012152409 | A1 | 11/2012 |
| WO | 2013080855 | A1 | 6/2013 |
| WO | 2014000846 | A1 | 1/2014 |

OTHER PUBLICATIONS

English Abstract of WO20090100803, Publication Date: Aug. 20, 2009.
Cairns, D. R. et al., "Switching dynamics of suspended mesogenic polymer microspheres," Applied Physics Letters, Apr. 30, 2001, vol. 78, No. 18, pp. 2643-2645.
Ohm, C. et al., "Microfluidic synthesis of highly shape-anisotropic particles from liquid crystalline elastomers with defined director field configurations," JACS, 2011, vol. 133, pp. 5305-5311.
Forsters, J. D. et al., "Assembly of Optical-Scale Dumbbells into dense photonic crystals," ACS Nano, 2011, vol. 5, No. 8, pp. 6695-6700.
Amimori, I. et al., "24.3: Optical and Mechanical Properties of Stretched PDLC Films for Scattering Polarizers," SID 02 Digest, 2002, pp. 834-837.
Alexander, L. et al., "Dunking doughnuts into cells—selective cellular translocation and in vivo analysis of polymeric micro doughnuts," Chem. Commun., 2008, No. 30, pp. 3507-3509.
Shafran, M. et al., "Electrically Switchable Liquid Crystal Polymer Rod Actuators," Mater. Res. Soc. Symp. Proc., 2008, vol. 1096.
Fernandez-Nieves, A. et al., "Engineering colloids with optical and geometrical anisotropies: de-coupling size monodispersity and particle properties," Soft Matter, 2006, vol. 2, pp. 105-108.
Sandomirski, K. et al., "Highly birefringent colloidal particles for tracer studies," Journal of Physics: Condensed Matter, 2004, vol. 16, pp. S4137-S4144.
Spillmann, C. M. et al., "Role of Surfactant in the Stability of Liquid Crystal-based Nanocolloids," Langmuir, 2009, vol. 25, pp. 2419-2426.
Yang, Z. et al., "Shape-memory nanoparticles from inherently non-spherical polymer colloids," Nature Materials, Jun. 2005, vol. 4, pp. 486-490.
Vennes, M. et al., "Anisotropic particles from LC polymers for optical manipulation," Macromolecules, 2006, vol. 39, pp. 8326-8333.
Haseloh, S. et al., "Synthesis of Liquid-Crystalline Colloids in nonpolar media and their manipulation in electric fields," Macromolecular Chemistry and Physics, 2009, vol. 210, pp. 1394-1401.
Haseloh, S. et al., "Control of mesogen configuration in colloids of liquid crystalline polymers," Soft Matter, 2010, vol. 6, pp. 4112-4119.
Ohm. C. et al., "A continuous Flow Synthesis of Micrometer-sized actuators from liquid crystalline elastomers," Adv. Mater., 2009, vol. 21, pp. 4859-4562.
Cairns, D. R. et al., "Stimulus-responsive fluidic dispersions of rod shaped liquid crystal polymer colloids," Materials Letters, 2010, vol. 64, pp. 1133-1136.
Merkel, T. J. et al., "Scalable, shape-specific, top-down fabrication methods for the synthesis of engineered colloidal particles," Langmuir, 2010, vol. 26, No. 16, pp. 13086-13096.
Baron, M. et al., "Definitions of basic terms relating to low-molar-mass and polymer liquid crystals," Pure Appl Chem, 2001, vol. 73, pp. 845-895.
Tschierske, C. et al., Angew. Chem., 2004, vol. 116, pp. 6340-6368.
English Abstract for DE19602795, Publication Date: Jul. 31, 1997.
English Abstract of JP2001262144, Publication Date: Sep. 26, 2001.
English Abstract for JPH10062739, Publication Date: Mar. 6, 1998.

* cited by examiner

REACTIVE MESOGEN BASED POLYMER PARTICLES

This application is a U.S. National Stage Application under 35 U.S.C. §371 of International Application No. PCT/EP2015/000048 filed on Jan. 14, 2015, and claims benefit to European Patent Application Nos. EP 14000508.3 filed on Feb. 13, 2014.

This invention relates to a process for the preparation of optical and shape anisotropic polymer particles comprising monomer units of at least one reactive mesogen, such particles per se, the use of these particles for the preparation of optical, electrooptical, electronic electrochemical, electrophotographic, electrowetting and electrophoretic displays and/or devices and security, cosmetic, decorative, and diagnostic applications, and electrophoretic fluids and displays.

Reactive mesogens (RMs), when polymerised at temperatures at which they exhibit thermotropic liquid crystal phases (typically nematic, cholesteric or smectic), produce polymers with a degree of optical anisotropy. The study of the properties and applications of encapsulated liquid crystals has been developed for a long time but the synthesis of polymer particles made of the mass produced RMs is a new field of research that opens a new field of application for this kind of materials, being the issue of the this invention report. Because of the alignment of the molecular director is frozen, the particles exhibit optical anisotropy and they behave as a liquid crystal by themselves responding to electric and magnetic fields. Besides the particles also exhibit anisotropic shape what is helpful for the response under external stimuli used in applications such as optical switches (Applied Physics Letters 2001, 78, 2643-2645), actuators (Journal of the American Chemical Society 2011, 133, 5305-5311), photonic crystals construction due to the self-assembly of the anisotropic particles (ACS Nano 2012, 8, 6695-6700), polarising activity (e.g. scattering polarisers (Digest of Technical Papers—Society for Information Display International Symposium 2002, 834-837) or for improving the cellular uptake due to surface effects (Chem. Commun. 2008, 3507-3509).

It has been disclosed in WO 2003027761, DE 19602848, DE 19602795, JP 2001262144 and WO 2004005425 that a range of RMs can be used to prepare particles (sometimes described as flakes). These particles can reflect colours of various wavelengths and have proven applications in pigments, and broadband reflection films. In addition, a method of using particles containing various amount of RMs in electro-optical devices is disclosed in JP 10062739 which discusses a thermally switching PDLC device.

In 2001, Crawford et al. (Applied Physics Letters, 78(18), (2001), 2643-2645) prepared particles from RM257 using an emulsification process in glycerol, followed by an in-situ photopolymerisation step with UV light. These particles rotate under in-plane electric fields. Shafran et at. (Mater. Res. Soc. Symp. Proc. 1096 (2008)) also reported nano-rods made from RM257 using a template and UV light to fix the conformation. These rods show rotational and translational movement under DC and AC electric fields. Preparation of anisotropic LC particles has been also described by Fernandez et al. (Soft Matter, 2, (2006), 105-108) using microfluidics to produce monodisperse particles in water. By increasing the quantity of PVA it is possible to make a film that can be stretched to obtain tactoidal particles. This conformation can be fixed by polymerisation of the stretched film under UV light. Although this process can be used to obtain particles that have both shape and internal anisotropy, it is not a straightforward method for making particles with both, optical and shape anisotropy. Sandomirski et al. prepared 100 nm-1 μm colloidal particles of RM257 by emulsification in aqueous solution and in-situ photopolymerisation (J. Phys.:Condens. Matter, 16, (2004), 4137-4144). Studies regarding formation and stability of LC colloids depending on surfactant have been performed by Spillmann et al. (Langmuir, 25, (2009), 2419-2426), in which 200 nm colloids were prepared by sonication of the RM dissolved in chloroform and water. Terentjev et al. synthesised particles made of main chain liquid crystal polymers via miniemulsion technique (Nature Materials, 4, (2005), 486-490). They observed ellipsoidal particles with different aspect ratio depending on the particle size.

Zentel et al. showed that RM particles could also be made via dispersion polymerisation in mixtures of ethanol/methoxyethanol (Macromolecules, 39, (2006), 8326-8333) and THF/silicon oil (Macromol. Chem. Phys, 210, (2009), 1394-1401 and Soft Matter, (2010), 6, 4112-4119).

The spherical particles obtained by this method show optical anisotropy and could be manipulated under electric fields and optical tweezers. However, a mixture of different director orientations is present inside the same system and they do not show shape anisotropy. Zentel et al also synthesised elastomeric LC particles via microfluidics showing ellipsoidal shape (Adv. Mater, (2009), 21, 4859-4862). The shape anisotropy is achieved by introducing elastomeric spherical particles into a capillary which has a smaller diameter than the elastomeric particles. In an additional step, the early deformed particles are polymerised.

A similar template process approach was described by Cairns et al. for producing optical anistropic nanorods made of RM257 (Material Letters, (2010) 64, 1133-1166). After removing the template and a sonification process, the particles showed optical and shape anisotropy.

An example of particles which exhibit optical and shape anisotropy is found in WO 2012/152409 that describes the way to produce optical and in some cases shape anisotropic RM particles by the heterogeneous system based on emulsion polymerisation. In this polymerisation the monomer has a low solubility in the continuous phase (solvent) and needs to be emulsified in a previous step to the addition of the initiator for starting the polymerisation (the initiator has low solubility in the continuous phase).

Several methods have been developed for obtaining shape anisotropic polymer particles such as emulsion polymerisation, miniemulsion polymerisation, seeded emulsion polymerisation, seeded dispersion polymerisation, seeded suspension polymerisation, template techniques, different lithography approaches, deformation-based methods, etc. (Langmuir, 2010, 16, 13086-13096). However, almost all of them have several limitations in e.g. they involve several steps, sophisticated equipments, problems with the size and homogeneity of the particles and/or they are not able to scale-up the particles production.

So, there is still a need for optical and shape anisotropic polymer particles and for a straightforward and industrially viable synthetic process for obtaining optical and anisotropic shape particles.

This object is solved by a process for the preparation of optical and shape anisotropic polymer particles comprising dispersion polymerisation of at least one reactive mesogen having a molecular unit providing non-covalent interactions in the polymer particles.

The present invention simplifies the complicated preparation of polymer particles having shape anisotropy and optical anisotropy. This invention relates to the direct synthesis of optical and shape anisotropic polymer particles containing monomer units of at least one reactive mesogen (RM) obtained by dispersion polymerisation without additional steps.

Furthermore, the present invention is directed to polymer particles with optical anisotropy and shape anisotropy prepared by the present process, to polymer particles with optical anisotropy and shape anisotropy comprising monomer units of at least one specific reactive mesogen having a molecular unit providing non-covalent interactions in the polymer particles, and the use of the polymer particles according to the invention for the preparation of optical, electrooptical, electronic, electrochemical, electrophotographic, electrowetting and electrophoretic displays and/or devices and security, cosmetic, decorative, and diagnostic applications, and electrophoretic fluids and displays comprising the polymer particles.

The present invention does not provide a bimodal system based on nanoparticles and microparticles. So, no additional step for isolating the nano and micro particles is necessary. Besides, the new particles show preferably excellent response under electric and magnetic fields and a monodisperse size which is desirable especially for electrophoretic devices and coatings.

The present invention describes the one-step synthesis of RM particles with, both, optical and shape anisotropy by dispersion polymerisation. Dispersion polymerisation is a homogeneous polymerisation. The term "homogeneous polymerisation" means polymerisation in a homogeneous medium (i.e. a medium consisting only of one phase). The term "dispersion polymerisation" means polymerisation wherein both the monomer and the initiator are soluble in the polymerisation medium. The polymerisation starts in the polymerisation medium, and the polymer precipitates from the polymerisation medium.

Homogenous polymerisation normally leads to spherical particles because of the minimisation of the interfacial free energy between the particles and the medium. However, by controlling specific interactions (i.e. non-covalent interactions) it is possible to define different shapes like oblate or prolate particles with different aspect ratios, being one of the most challenging issues related to the colloids field due to the potential applications. Oblate particle means a particle that is a spheroid or has a spherical shape, in which the equatorial diameter is greater than the distance between poles, like a "smartie" shape.

Prolate particle means a particle that is a spheroid or has a spherical shape, in which the polar axis is greater than the equatorial diameter, like a "rubgy-ball" shape.

Further particle shapes may be toroidal (doughnut like) or red blood cell-like, diamond shape and tactoidal shape with even different aspect ratio.

The invention provides an industrially viable synthesis of RM particles with preferably one or more of the following properties:

Well defined molecular director orientation
Tuneable shape anisotropy (different values of aspect ratio, length/width and flattening are obtained)
Tuneable refractive index
Coloured particles
Fluorescent particles
Reflective particles Throughout the specification the following terms are used:

The terms "particle(s)" and "polymer particle(s)" are used interchangeably, and mean a multitude of isolated solid particles having uniform shape and defined dimensions, which are preferably obtained directly from a monomeric material by a polymerisation process, preferably by a homogeneous polymerisation process, especially by dispersion polymerisation. The particles according to the present invention have optically anisotropic properties and anisotropic shape.

The term "mesogenic group" means a group with the ability to induce liquid crystal (LC) phase behaviour. Mesogenic groups, especially those of the non-amphiphilic type, are usually either calamitic or discotic. The compounds comprising mesogenic groups do not necessarily have to exhibit an LC phase themselves. It is also possible that they show LC phase behaviour only in mixtures with other compounds, or when the mesogenic compounds or the mixtures thereof are polymerised. For the sake of simplicity, the term "liquid crystal" is used hereinafter for both mesogenic and LC materials.

The term "reactive mesogen" (RM) means a polymerisable mesogenic or liquid crystalline compound, which is preferably a monomeric compound.

The term "spacer" or "spacer group", also referred to as "Sp" below, is known to the person skilled in the art and is described in the literature. Unless stated otherwise, the term "spacer" or "spacer group" above and below denotes a flexible organic group, which in a polymerisable mesogenic compound ("RM") connects the mesogenic group and the polymerisable group(s).

For an overview of terms and definitions in connection with liquid crystals and mesogens see Pure Appl. Chem. 73(5), 888 (2001) and C. Tschierske, G. Pelzl and S. Diele, Angew. Chem. 2004, 116, 6340-6368.

In particular, this invention concerns new polymer particles with optical anisotropy and shape anisotropy comprising monomer units of at least one reactive mesogen having a molecular unit providing non-covalent interactions in the polymer particles. The polymer particles of the invention preferably comprising monomer units of at least one reactive mesogen having a molecular unit providing π-interactions, hydrogen-bondings, and/or halogen-halogen interactions in the polymer particles. Evidence of this kind of non-covalent interaction is the fluorescence of the polymer which is not present in the monomer.

Reactive mesogen preferably used for the preparation of polymer particles according to the invention comprise at least one diphenylacetylene group also known as "tolane group".

RMs according to Formula I are especially preferred:

Formula I wherein
P=a polymerisable group,
$Sp^1$ and $Sp^2$=independently of one another a spacer group,
L', L", and L'''=independently of one another P-Sp-, F, Cl, Br, I, —CN, —NO$_2$, —NCO, —NCS, —OCN, —SCN, —C(=O)NR$^{00}$R$^{000}$, —C(=O)X$^0$, —C(=O)OR$^{00}$, —C(=O)R$^0$, —NR$^{00}$R$^{000}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, $R^1$=H, alkyl with 1 to 12 C-atoms or O—$R^2$ with $R^2$=H or alkyl with 1 to 12 C-atoms, Formula II Formula III Formula IV Formula V $R^o$, $R^{oo}$, and $R^{ooo}$=independently of each other denote H or alkyl with 1 to 12 C-atoms, r', r", and r'"=independently of one another, 0, 1, 2, 3 or 4.

The polymerisable group P is preferably selected from methacrylates, acrylates, methacrylamides, acrylamides, acrylonitriles, α-substituted acrylates, styrenes, vinyl, substituted vinyl. Especially preferred are methacrylate and/or acrylate groups.

Preferred spacer groups $Sp^1$ are an alkylene chain, (poly) ether, poly-dialkylsiloxane. Spacer group $Sp^1$ may be for example a group -(A-B)$_m$— with A=linear or branched alkylene, preferably with 1 to 12 carbon atoms, especially with 1 to 6 carbon atoms, B=O or S, preferably O, and m=0 to 5, preferably 1 to 3, especially 1.

Preferred spacer groups $Sp^2$ are —COO—, —OCO—, —CH$_2$CH$_2$—, —CF$_2$O—, —OCF$_2$—, —C≡C—, —CH=CH—, —OCO—CH=CH—, —CH=CH—COO—, or a single bond, especially —COO— and —C≡C—.

L', L", and L'" are preferably, also in case of multiple occurrence in one phenyl ring, independently of one another, selected from halogen, preferably F or Cl, CN or optionally halogenated alkyl, alkoxy, alkylcarbonyl, alkoxycarbonyl, alkylcarbonyloxy or alkoxycarbonyloxy with 1 to 5 C atoms, especially —F, —Cl, —CN or optionally halogenated alkyl, $R^1$ is preferably alkyl with 1 to 3 C-atoms or —O—$R^2$ with $R^2$=alkyl with 1 to 3 C-atoms, particularly —O—CH$_3$.

r', r", and r'" are preferably, independently of one another, 0 or 1.

Advantageously, compounds of Formula I are used, wherein P is an acrylate or methacrylate group, $Sp^1$ is —(CH$_2$)$_n$—O— with n=1-6, $Sp^2$ is —COO— or —C≡C—, L" is halogen with r"=0 or 1, r' and r'"=0, and $R^1$ is —O—CH$_3$. Especially, L" is in the ortho position to $Sp^2$.

In particular, RMs according to Formulae II-V, especially of Formula II, are used

The polymer particles of the invention may additionally comprise at least one co-monomer. The polymer particles can contain a co-monomer which can be any suitable monomer which can copolymerise with the selected RM or with a blend of several reactive mesogens, known as a reactive mesogen mixture (RMM). The particles can be prepared from most monomer types, in particular methacrylates, acrylates, acrylamides, methacrylamides, acrylonitriles, α-substituted acrylates, styrenes and vinyl ethers, vinyl esters, and propenyl ethers. Mixtures of monomers may also be used.

Preferably, at least one co-monomer is selected from reactive mesogens different to those of Formulae I—V, polymerisable dyes, ionic co-monomers, and polymerisable stabilisers, wherein the co-monomers comprise one or more ethylenically unsaturated groups.

Advantageously, for tuning the shape of the polymer particles a chiral additive may be added to the polymerisable mixture. Polymerisable or unpolymerisable chiral additives may be used. Suitable chiral additives can be selected from chiral RMs and chiral dopants, many of which are well known to the skilled person and are commercially available.

Suitable unpolymerisable chiral compounds are for example chiral dopants like R- or S-811, R- or S-1011, R- or S-2011, R- or S-3011, R- or S-4011, R- or S-5011, or CB 15 (all available from Merck KGaA, Darmstadt, Germany).

Suitable polymerisable chiral compounds are for example chiral RMs (R1) to (R10) listed below, or the polymerisable chiral material Paliocolor® LC756 (from BASF AG, Ludwigshafen, Germany).

wherein P has one of the meanings given for $P^0$ above, $Z^0$, u, v, x, y, $R^0$ and A are as defined above, and $L^1$ and $L^2$ have independently of each other one of the meanings of L as given above.

Very preferred are chiral compounds with a high helical twisting power value (HTP) in order to use only a small amount, in particular compounds comprising a sorbitol group as described for example in WO 98/00428, compounds comprising a hydrobenzoin group as described for example in GB 2,328,207, chiral binaphthyl derivatives as described for example in WO 02/94805, chiral binaphthol acetal derivatives as described for example in WO 02/34739, chiral TADDOL derivatives as described for example in WO 02/06265, and chiral compounds having at least one fluorinated linkage group and a terminal or central chiral group as described for example in WO 02/06196 or WO 02/06195.

Especially preferred are chiral compounds with a HTP of 40 µm$^{-1}$ or higher, very preferably 60 µm$^{-1}$ or higher, most preferably 80 µm$^{-1}$ or higher.

Especially preferred are polymerisable sorbitols like those of formula (R8) and (R9) and polymerisable hydrobenzoins like those of formula (R10).

Further preferred are non-polymerisable sorbitols and hydrobenzoins of formula M1 and M2 below. Further preferred are chiral binaphthols of formula M3 and M4 below.

M1

M2

M3

M4 wherein P, $Z^0$, A $L^1$, $L^2$, v and x have the meanings given above, $R^1$ has one of the meanings of $R^0$ given above or is P-Sp, R has one of the meanings of $R^0$, m is 0, 1, 2 or 3 and r1 and r2 are 0, 1, 2, 3 or 4.

Very preferred are compounds of formula M3 wherein $R^1$ is P-Sp. Further preferred are compounds of formula M3 wherein m is 0 or 1, $Z^0$ is —COO—, —OCO— or a single bond, A is 1,4-phenylene optionally substituted by 1 or 2 groups $L^1$ or trans-1,4-cyclohexylene.

Especially, for tuning the shape of the polymer particles from oblate to prolate BDH1281 from Merck KGaA, a compound of the following Formulae VI, can preferably be used.

Formula VI

Additional reactive mesogens different to those of Formulae I-V used as co-monomers can be selected from a wide range of reactive mesogens. In principle any reactive mesogen with at least one polymerisable group, preferably at least two polymerisable groups is suitable. It is also possible to use a blend of several reactive mesogens, known as a reactive mesogen mixture (RMM). By using co-monomers the refractive index and physical properties of the particles can be adjusted. Preferably, the following RMs can be used RM 257, RM A, RM B, and RM C, especially RM 257 and RM A.

RM 257

RM A

RM B

RM C

Coloured polymeric particles can preferably be obtained by incorporating a polymerisable dichroic dye or, preferably another polymerisable dye in the particle formation step. Especially, the polymerisable dyes described in WO 2010/089057 and WO 2010/089060 are suitable for incorporation in the polymer particles of the invention. Preferably, the polymerisable dye used as co-monomer is selected from azo dyes, preferably monoazo dyes, disazo dyes, and/or metallised azo dyes, metallised dyes, anthraquinone dyes, phthalocyanine dyes, benzodifuranones dyes, Brilliant Blue derivatives, pyrroline dyes, squarilium dyes, triphendioxazine dyes or mixtures of these dyes in order to tune the shade of the particles. Preferably, acrylate or methacrylate derivatives of Disperse red 1, dyes of Formula VII, especially methacrylate or acrylate derivative of cationic Basic Blue 41, and dyes of Formula VIII, especially with R5 and R6=CH$_3$ and dyes of Formula IX, especially with R7 and R8=CH$_3$ are used for the invention.

Formula VII wherein R1, R2, R3=alkyl, preferably C1-C4 alkyl, R4=H or CH$_3$
A$^-$=halogen, monobasic acid (oxo) anions, preferably acetate, propionate, lactate, methane sulphonate, p-toluenesulphonate, hydroxide, or nitrate, preferably with R1, R2, R4=CH$_3$ and R3=C$_2$H$_5$ and A$^-$=methane sulfonate;

Formula VIII wherein R5=C1-C4 alkyl, preferably CH₃,
R6=H or CH3, preferably CH₃,
Hal=halogen, preferably Cl;

Formula IX wherein R7=alkyl, preferably C1-C4 alkyl, especially CH₃,
R8=H or CH3, preferably CH₃.

Especially preferred are Disperse red 1 methacrylate, methacrylate derivative of cationic Basic Blue 41, and dye of Formula 3 with R7 and R8=CH₃. The preparation of the latter dyes is described in WO 2010/089057 and WO 2010/089060.

Preferred polymerisable dyes with at least two polymerisable groups may be chosen for example from compounds of Formula X:

Formula X wherein the aromatic or heteroaromatic cycles are substituted by one or more different or identical groups R selected from the group consisting of H, alkyl, preferably C1-C6 alkyl, substituted or non-substituted aryl, —F, —Cl, —Br, —I, —OR', —SR', —C(O)R', —C(O)OR', —NHCOR', —NO₂, —CN, —SO₃H, —NR'R preferably —CH₃, —NO₂, —CN, —COCH₃, —CO₂CH₂CH₃, —NHCOCH₃, with R' and R" independently of one another equal to H or alkyl, preferably C1-C6 alkyl, and L¹ and L² are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, preferably phenylene or C1-C6 alkyl, preferably identical, and Y¹ and Y² are independently of one another, polymerisable group, preferably acrylate or methacrylate, preferably identical.

Preferably groups R are selected from H, C1-C6 alkyl, preferably CH₃, —C(O)R', —C(O)OR', —NO₂, —CN, —NHCOR', with R' independently of one another equal to C1-C6 alkyl, preferably C1 or C2 alkyl.

Preferably groups L¹ and L² are selected from phenylene or C1-C6 alkyl, a polyether alkyl chain, or a combination thereof, preferably C2-C4 alkyl, especially C2 and C4 alkyl. Especially identical groups L¹ and L² are preferred.

Preferably groups Y¹ and Y² are selected from acrylate and methacrylate. Especially identical groups Y¹ and Y² are preferred.

N,N-bis-(2-Methacryloyloxyethyl)-4-(4-nitrophenylazo)-aniline (MR3) is particularly preferred, dye of formula XI.

This dye may be prepared by reaction of commercial CI Disperse Red 19 with methacryloyl chloride in the presence of triethylamine. Similar dyes may be prepared accordingly.

Formula XI

The present process also provides a route to tune charge and charge anisotropy of particles. This parameter can be further influenced by charge added to the particle through copolymerisation of a suitable monomer. If this charge can further be aligned with the liquid crystalline director such that a particle could adopt charge anisotropy, this could further increase switching speeds of particles in display. This can be achieved by the use of a charged reactive mesogen containing suitable charged groups such as $SO_3^-$ and $NR_4^+$, especially $COO^-$.

Polymer particles according to the invention can also contain functional nanoparticles e.g, titania or silver nanoparticles. Preferably titania nanoparticles such as Du Pont R96 and Huntsman TR-92 can be used in the present invention. Other functional singles or polymerisable compounds can be added in order to provide the desired properties e.g. selective reflection, high refractive index, pH-response or high thermal stability.

Polymer particles with optical anisotropy and shape anisotropy according to the present invention are preferably used in optical, electrooptical, electronic electrochemical, electrophotographic, electrowetting and electrophoretic displays and/or devices, and in security, cosmetic, decorative, and diagnostic applications. These polymer particles are especially used for the preparation of a mono, bi or polychromal electrophoretic device. Preferably, the new polymer particles with optical anisotropy and shape anisotropy comprising monomer units of at least one reactive mesogen and at least one polymerisable dye are used, wherein the polymer particles comprise the preferred variants and combinations of reactive mesogens and co-monomers.

Furthermore, the present invention relates to a process for the preparation of polymer particles with optical anisotropy and shape anisotropy as described in the foregoing. Particularly, the present invention relates to the direct preparation of polymer particles made of RMs by dispersion polymerisation.

As used herein, the term "dispersion polymerisation" means polymerisation wherein both the monomer or the monomers and the initiator are soluble in the polymerisation medium. The polymerisation starts in the polymerisation medium, and the polymer precipitates from the polymerisation medium. Dispersion polymerisation is a special case of homogeneous polymerisation which means polymerisation in a homogeneous medium (i.e. a medium consisting only of one phase). Preferably the polymerisation according to the invention is a free radical polymerisation, preferably thermal polymerisation.

The solvent should dissolve the RM, initiator and the surfactant as the dispersion polymerisation is a homogenous system based on one phase, contrary to emulsion polymerisation or seeded polymerisations. Preferred solvents are polar such as ethanol but a mixture of polar-polar or polar-apolar solvents can be use for tuning the shape and the size of the particles or for tuning the dielectric constant, refractive index, density and viscosity. Suitable solvents are water, toluene, ethylene glycol, glycine, ethanol, 3-pentanol, and butanol, especially ethanol and 3-pentanol.

Preferably a surfactant is added to keep the particles dispersed and stabilised in the polar medium. Typical surfactants are block, branched, comb-like or graft polymers that prevent the coalescence of the particles. Examples are known to experts in the field and include (but are not limited to) block copolymers of the type A-B or A-B-A, where one of the blocks is preferably and aromatic block for example polystyrene or polyvinylnaphthalene and the other a polyolefin for example polyethylene, polypropylene, polybutylene or polybutadiene. Commercially available Kraton G 1701 and Septon 1001, are suitable examples. Charged surfactants such as ammonium lauryl sulphate, sodium lauryl sulphate (SDS) or non-charged surfactants such as hydroxipropyl cellulose (HPC), polyethylene glycol alkyl ethers or polypropylene glycol alkyl ethers. Preferably PVP is used.

Polyvinylpyrrolidone (PVP) is a branched polymer, physiologically inert, dispersing element and soluble in water and in several organic solvents such as ethanol or toluene. These properties give PVP a high flexibility in industrial application e.g. coatings, adhesives, detergents and soaps, textile, polymerisation additive, colorant dispersions or pharmaceutical applications.

The initiator could have a double function as it is needed to start the polymerisation and it can charge the polymer by leaving charged residues on the polymer. The initiator should be soluble in the solvent. Examples of this kind of charged leaving initiators are those such as ammonium peroxodisulfate (APS), 4,4'-azobiscyanovaleric (Vazo 68) (Wako Chemicals), 2,2'-azobis(2methylpropionamidine)dihydrochloride (V-50) (Wako Chemicals)) or 2,2'-azobiscyanovaleric acid (ACVA) (Wako Chemicals). In principle this kind of initiator can be used but in the present process, too. The initiators used do not leave a charge on the polymer and they are those such as 2,2'-azobis(2-methylbutyronitrile) (Vazo 59) (Wako Chemicals), azobis(isobutyronitrile) (AIBN) (Wako Chemicals), tert-butylperoxybenzoate, azobiscyclohexencarbonitril, lauroyl peroxide, 2,5-bis(tert-butylperoxy)-2,5-dimethyl-3-hexane (Sigma-Aldrich).

In general, reactive mesogens (RMs), surfactant and other chemical are dissolved in ethanol. Then, the thermal initiator (which is soluble in the solvent) is added and the reaction is left to polymerise under nitrogen. Advantageously, the process comprises the steps of dissolving at least one RM, an initiator and a surfactant in an organic solvent and polymerising the RM using conventional polymerisations. Preferably, a thermal polymerisation is used because it is easy to scale to mass production but photoinitiation can be also used.

The process described above allows to prepare monodisperse, non-reflective, reflective, coloured, uncoloured, fluorescent RM particles with optical and/or shape anisotropy in a single step.

Additionally, by using this synthetic procedure the particles may have the following properties: it is possible to introduced cross-linkers for adding solvent resistance properties, a non-swelling nature, impact strength, hardness, dispersibility in a non-polar continuous phase after an easy solvent transfer process, electric and magnetic response at low fields, bright colour, tuneable refractive index over a range making them suitable as scattering reflective or solvent matched particles. A wide number of possible anisotropic shapes can be obtained with small changes in the formulation of the particles. Different shapes mean different properties and new possible applications for the particles as described above. The particles show internal director orientation, shape anisotropy, response under very low electric and magnetic fields and they exhibit fluorescent properties.

The preferred variants and combinations of reactive mesogens and co-monomers as described in the foregoing are preferably used in the process according to the invention.

Figure 1:
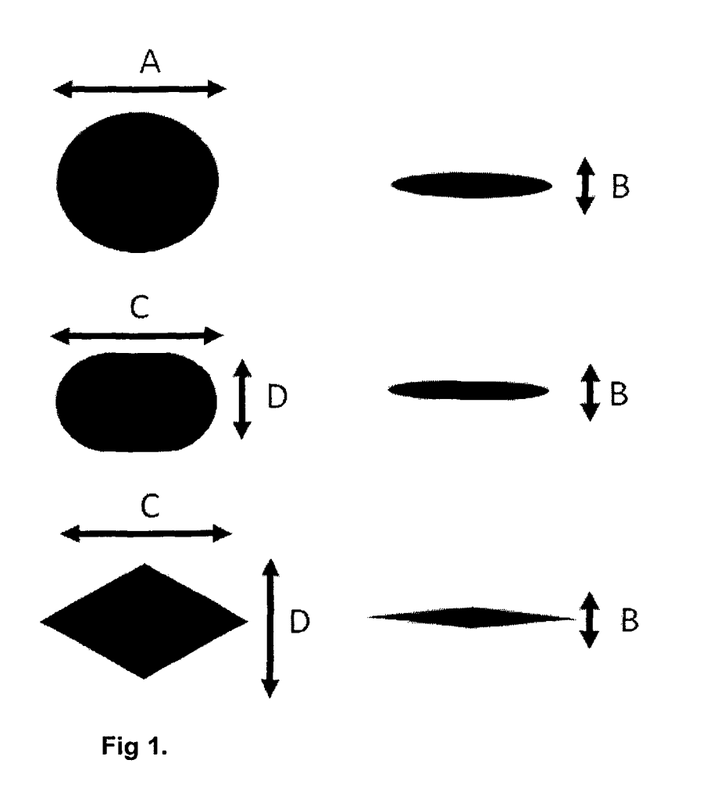
FIG. 1: Schematic representation of the different shapes described in the present invention. (Left: top-view; Right: side-view).

Depending on the polymerisation conditions, the shape of the particles can be controlled, to give for example particles with oblate shape or prolate shape or diamond shape (FIG. 1).

Preferably for the preparation of particles with an oblate shape, 5 g RM in 70 ml ethanol, 100-200 mg initiator, and 200 to 1000 mg, preferably 250 mg, surfactant can be used. PVP is preferred as surfactant. Preferably, 1-8% wt, especially 2-6% wt, of a chiral compound may be added.

Preferably for the preparation of particles with a prolate shape, 5 g RM in 70 ml ethanol, 100-150 mg initiator, and 200 to 1000 mg, preferably 500 mg, surfactant can be used. PVP is preferred as surfactant. Preferably, 1-6% wt, especially 4-6% wt, of a chiral compound may be added.

Preferably for the preparation of particles with a diamond-like shape, 5 g RM in 70 ml ethanol, 150-200 mg initiator, preferably 200 mg and 200 to 1000 mg, preferably 500 mg, surfactant can be used. PVP is preferred as surfactant. Preferably, 1-6% wt, especially 4-5% wt, of a chiral compound may be added. All wt % (weight percentage) are based on the amount of the main RM.

The process developed here has the advantage over those described in the state of the art that it is industrially viable and can produce particles with one or a combination of the following properties:

Shape anisotropy in a range of tuneable shapes
Tuneable refractive index particles
Polydomain liquid crystalline particles
Liquid crystalline particles with global director configuration
Coloured particles.

The polymer particles according to the invention may have a size in the range of 1.4-1.0 microns and preferably with a monodisperse size distribution. Preferred particle sizes are 1 micron, especially below 1 micron. Particle sizes are determined by photon correlation spectroscopy of non-aqueous particle dispersions by a common apparatus such as a Malvern NanoZS particle analyser, or by electron microscopy and image analysis.

The dimensions of the particles are described by following the indications showed in FIG. 1 (Left: top-view; Right: side-view):

The polymer particles according to the invention may have a (C/D) ratio in the range of 1.7-1.3, preferably 1.7.

The polymer particles according to the invention may have a (A/B) or (C/D) ratio of 4.1-1.3, preferably above 2.0.

The polymer particles according to the invention may have a B value in the range of 450-350 nanometer, preferably between 200-100 nanometer.

The polymer particles prepared by the present process are especially suitable in the optical display field because there is need for new display modes providing a good bright and black state and the ability to switch between both states more quickly at lower voltages than the current displays.

Polymer particles according to the invention are preferably used in optical, electrooptical, electronic electrochemical, electrophotographic, electrowetting and electrophoretic displays and/or devices, and in security, cosmetic, decorative, and diagnostic applications. Especially, these polymer particles are used for the preparation of a mono, bi or polychromal device or coatings.

The polymer particles prepared by the present process are preferably suitable for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

Prior a solvent transfer step in case of using a polar solvent, the polymer particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

An EPD generally comprises charged electrophoretic particles dispersed in a fluid and constrained between two substrates, each comprising one or more electrodes. The space between the electrodes is filled with a dispersion medium which is colourless or a different colour to the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

The present process provides a route to tunably anisotropic shaped particles. Shape Anisotropy in EPD is advantageous. An important parameter in the electrophoretic device is the speed of switching which is in turn related to the charge and shape factor of a particle. In this case, a particle which retains the same volume but has low drag in one special orientation would move more quickly in a device than an equivalent spherical particle of the same volume. Also a higher optical density is expected in the case of oblate particles due to the more efficient packing compared to spherical particles.

The polymer particles according to the present invention are also suitable for developing optical coatings with selective reflections.

The disclosures in the cited references are thus expressly also part of the disclosure content of the present application. Unless the context clearly indicates otherwise, plural forms of the terms used herein are to be construed as including the singular form and vice versa. In the claims and the description, the words "comprise/comprises/comprising" and "contain/contains/containing" mean that the listed components are included but that other components are not excluded. In the foregoing and in the following examples, unless otherwise indicated all parts and percentages are by weight (wt). The following examples explain the present invention in greater detail without restricting the scope of protection. In the foregoing and in the following examples, unless otherwise indicated all parts and percentages are by weight.

EXAMPLES

List of Abbreviations

RM520: 4-(6-acryloxy-hexyloxy) benzoic acid-2-chloro-4-(4-methyoxy phenyl ethinyl) phenylester
RM257: 2-methyl-1,4-phenylene-bis[4-(3-acryloyloxypropyloxy)benzoate]
PVP: Polyvinylpyrrolidone
V-59: 2,2'-Azobis(2-methylbutyronitrile)
BDH1281: chiral dopant
MR3:N,N-bis-(2-Methacryloyloxyethyl)-4-(4-nitrophenylazo)-aniline
$TiO_2$ nanoparticles: R960

Reactive mesogens and chiral dopant are purchased from Merck KGaA, Darmstadt, Germany. V-59 is purchased from Wako. MR3 is prepared according to example 16 of WO 2012/019704. Titania nanoparticles are obtained from Du Pont. All other chemicals are sourced from Sigma-Aldrich at the highest grade possible and are used without further purification unless otherwise stated.

The following examples are synthesised via dispersion polymerisation. Reactive mesogens (RMs), surfactant and other chemical are dissolved in ethanol. Then, the thermal initiator (which is soluble in the solvent) is added and the reaction is left to polymerise under nitrogen. The particles show internal director orientation, shape anisotropy, respond under very low electric and magnetic fields and they exhibit fluorescent properties.

The characterisation of the formulations is performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Example 1: Preparation of a Particle Dispersion of RM520

2.5 g of RM520, 250 mg of PVP and 70 mL of ethanol are added into a 100 mL round bottomed flask. The reaction mixture is heated at 80° C. under nitrogen atmosphere and stirred at 500 rpm. Once all the components are solved 200 mg of Vazo 59 (thermal initiator) is added into the reaction and the reaction is left to polymerise for 2 hours. After the two hours the reaction is cooled down to room temperature and the reaction mixture is filtered through a 50 micrometer cloth.

Figure 2:
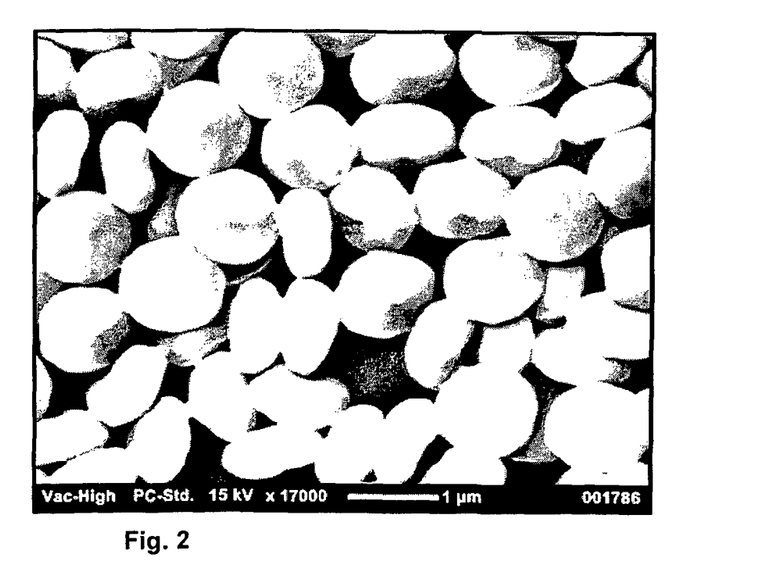
FIG. 2: Oblate spheroidal particles made of RM520 in ethanol according to Example 1

Highly oblate spheroidal particles result from this reaction (FIG. 2). The particles are monodisperse with a size of 1.1 microns and they exhibit a smartie-like shape with an (A/B) ratio of 2.05 and the flattening or oblateness (f) is 0.51.

Figure 3:
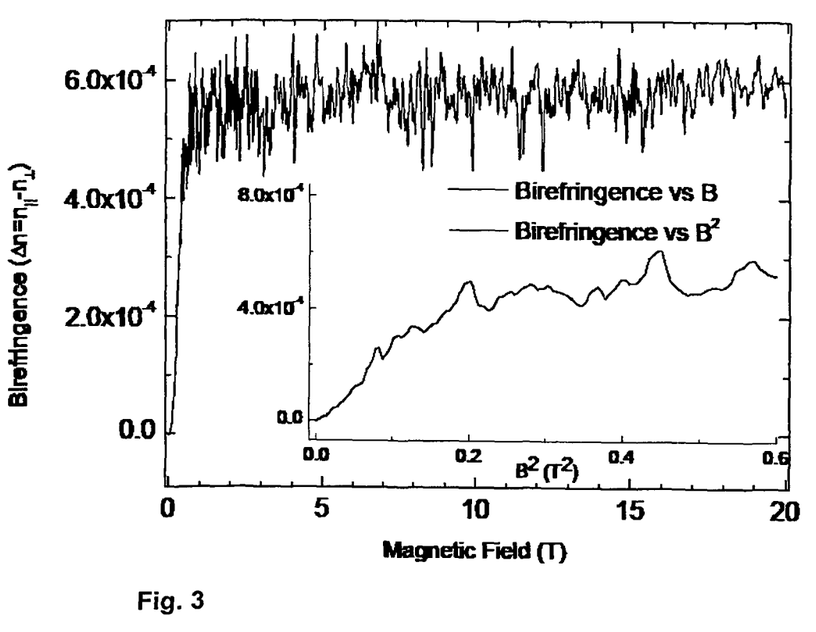
FIG. 3: Representation of the birefringence vs magnetic field of a dispersion of the particles according to Example 1.

Particles show the characteristic twinkling of bipolar colloids which results from the changing the director orientation during the Brownian motion. The particles rotate under low electric fields (30 mVpp, 100 Hz, ITO cells with 20 µm spacers) and they aligned parallel to the magnetic field at very low field value (0.1-0.5 T) (FIG. 3).

Example 2: Preparation of a Particle Dispersion of RM520 with High Flattening or Oblateness 5 g of RM520, 500 mg of PVP and 70 mL of ethanol are added into a 100 mL round bottomed flask. The reaction mixture is heated at 80° C. under nitrogen atmosphere and stirred at 500 rpm. Once all the components are solved 200 mg of Vazo 59 (thermal initiator) is added into the reaction and the reaction is left to polymerise for 2 hours. After the two hours the reaction is cooled down to room temperature and the reaction mixture is filtered through a 50 micrometer cloth.

Figure 4:
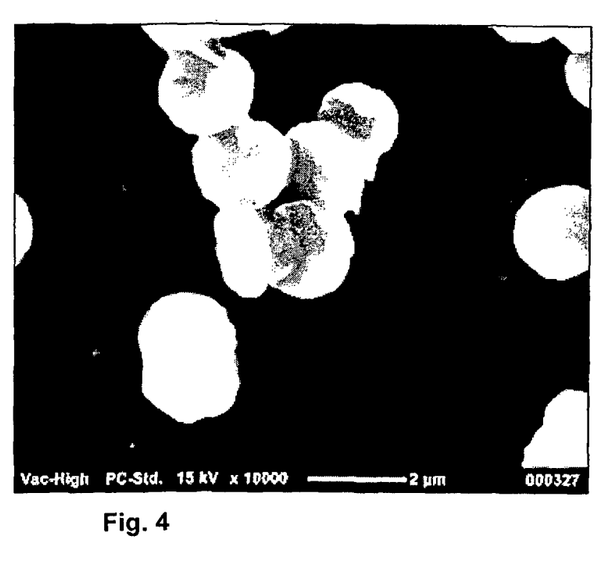
FIG. 4: Oblate spheroidal particles made of RM520 in ethanol with a high flattening value according to Example 2

Highly oblate spheroidal particles with a bipolar orientation of the molecular director result from this reaction. The size is 1.8 microns and compared to the particles described in example 1, they exhibit a flatter smartie-like shape what yields to an (A/B) ratio of 1.4 and the flattening or oblateness (f) is 0.76 (FIG. 4).

Example 3: Preparation of a Particle Dispersion of RM520 with Prolate Shape 5 g of RM520, 500 mg of PVP, 235.5 mg BDH1281 and 70 mL of ethanol are added into a 100 mL round bottomed flask. The reaction mixture is heated at 85° C. under nitrogen atmosphere and stirred at 500 rpm. Once all the components are solved 100 mg of Vazo 59 (thermal initiator) is added into the reaction and the reaction is left to polymerise for 2 hours. After the two hours the reaction is cooled down to room temperature and the reaction mixture is filtered through a 50 micrometer cloth.

Figure 5:
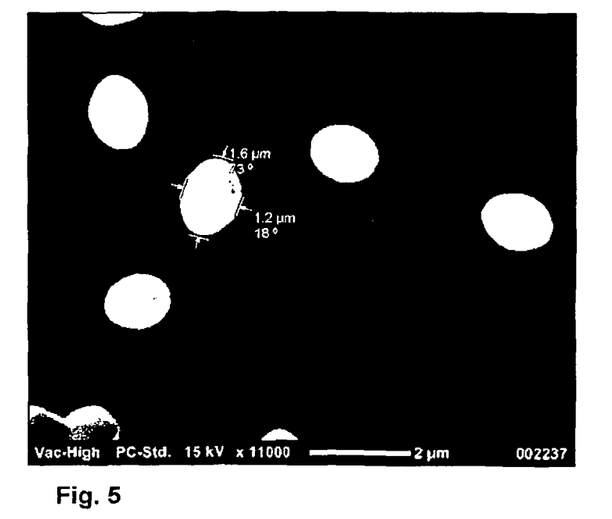
FIG. 5: Flat-prolate particles made of RM520 in ethanol according to Example 3
Figure 6:
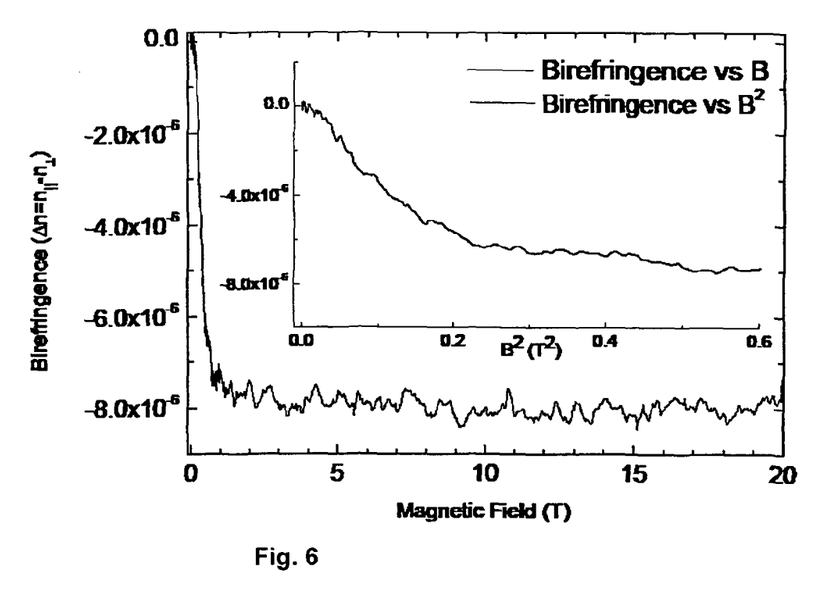
FIG. 6: Representation of the birefringence vs magnetic field of a dispersion of the particles according to Example 3

Flat-prolate particles with a bipolar orientation of the molecular director and with a perpendicular alignment respect to the magnetic field (0.5 T) are obtained (FIG. 5). The size is around 1.6 microns and the (C/D) ratio is 1.33, respectively. Birefringence vs magnetic field of a dispersion of the particles according to Example 3 is shown in FIG. 6.

Example 4: Preparation of a Particle Dispersion of RM520 with Diamond Shape 5 g of RM520, 500 mg of PVP, 235.5 mg BDH1281 and 70 mL of ethanol are added into a 100 mL round bottomed flask. The reaction mixture is heated at 85° C. under nitrogen atmosphere and stirred at 500 rpm. Once all the components are solved 200 mg of Vazo 59 (thermal initiator) is added into the reaction and the reaction is left to polymerise for 2 hours. After the two hours the reaction is cooled down to room temperature and the reaction mixture is filtered through a 50 micrometer cloth.

Figure 7A:
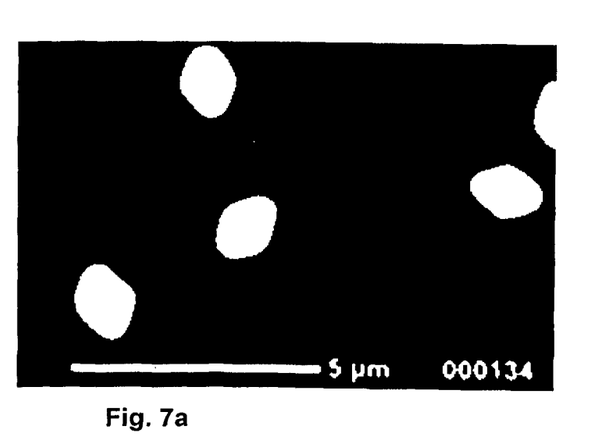
FIG. 7a: Diamond-shape particles made of RM520 in ethanol according to Example 4
Figure 7B:
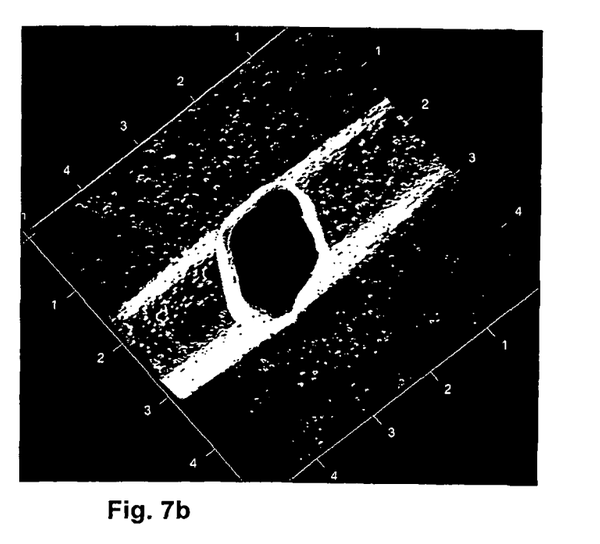
FIG. 7b: Diamond-shape particles made of RM520 in ethanol according to Example 4

Diamond-like anisotropic particles with a bipolar orientation of the molecular director result from this reaction. The dimensions of the particles are given by a (C/D) ratio of 1.68, (C/B) ratio is 2.28 and a B value of 0.7 microns (flattening of −0.8) (FIG. 7*a/b*).

Figure 8A:
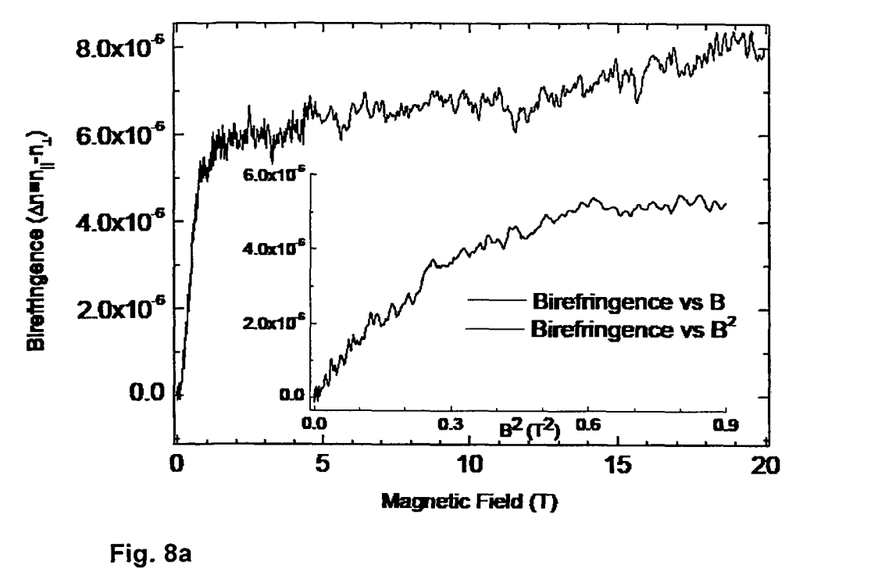
FIG. 8a: Representation of the birefringence vs magnetic field of a dispersion of the particles according to Example 4
Figure 8B:
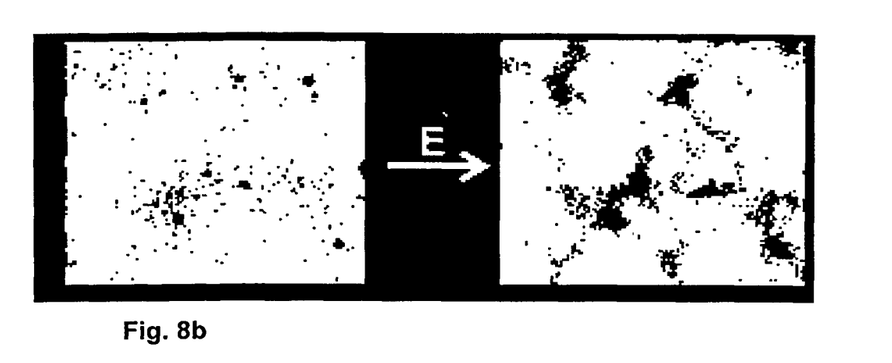
FIG. 8b: Self-assembly of the particles according to Example 4 under electric field

A reversible self-assembly process is observed under low frequency electric field (30 mVpp, 100 Hz, 20 microns). The particles redisperse again when the electric field is removed. Additionally, the particles align parallel to the magnetic field (1 T) (FIG. 8*a/b*).

Example 5: Preparation of a Particle Dispersion of Reactive Mesogen Mixture I (Monoacrylate+Diacrylate)

2.5 g of RM520, 250 mg of PVP, 12.5 mg RM257 and 70 mL of ethanol are added into a 100 mL round bottomed flask. The reaction mixture is heated at 85° C. under nitrogen atmosphere and stirred at 500 rpm. Once all the components are solved 200 mg of Vazo 59 (thermal initiator) is added into the reaction and the reaction is left to polymerise for 2 hours. After the two hours the reaction is cooled down to room temperature and the reaction mixture is filtered through a 50 micrometer cloth.

Oblate spheriodal particles with a size of 1.3 microns, (A/B) ratio=2.02, f=0.54 and bipolar orientation of the molecular director result from this reaction.

Example 6: Preparation of a Particle Dispersion of Reactive Mesogen Mixture II (Monoacrylate+Monoacrylate)

2.5 g of RM520, 250 mg of PVP, 125 mg of 4-(6-Acryloyloxy-n-hex-1-yloxy)benzoic acid and 70 mL of ethanol are added into a 100 mL round bottomed flask. The reaction mixture is heated at 85° C. under nitrogen atmosphere and stirred at 500 rpm. Once all the components are solved 200 mg of Vazo 59 (thermal initiator) is added into the reaction and the reaction is left to polymerise for 2 hours. After the two hours the reaction is cooled down to room temperature and the reaction mixture is filtered through a 50 micrometer cloth.

Highly oblate spheriodal particles with a size around 1.3 microns,
(A/B) ratio=1.93, f=0.63 and bipolar orientation of the molecular director result from this reaction.

Example 7: Preparation of a Particle Dispersion of RM520 Containing Titanium Dioxide Nanoparticles 2.5 g of RM520, 250 mg of PVP, 250 mg of $TiO_2$ nanoparticles (R960) and 70 mL of ethanol are added into a 100 mL round bottomed flask. The reaction mixture is heated at 85° C. under nitrogen atmosphere and stirred at 500 rpm. Once all the components are solved 200 mg of Vazo 59 (thermal initiator) is added into the reaction and the reaction is left to polymerise for 2 hours. After the two hours the reaction is cooled down to room temperature and the reaction mixture is filtered through a 50 micrometer cloth. Oblate spheriodal particles with a size around 1.1 microns, (A/B) ratio=2.07, f=0.52 and bipolar orientation of the molecular director result from this reaction.

Example 8: Preparation of a Red Coloured Particle Dispersion of RM520 and Merck Red 1

2.5 g of RM520, 250 mg of PVP, 12.5 mg of Methacrylated Disperse Red 1 (MR3) and 70 mL of ethanol are added into a 100 mL round bottomed flask. The reaction mixture is heated at 85° C. under nitrogen atmosphere and stirred at 500 rpm. Once all the components are solved 200 mg of Vazo 59 (thermal initiator) is added into the reaction and the reaction is left to polymerise for 2 hours. After the two hours the reaction is cooled down to room temperature and the reaction mixture is filtered through a 50 micrometer cloth. Oblate spheriodal particles with a size around 1.1 microns, (A/B) ratio=1.70, f=0.40 and bipolar orientation of the molecular director result from this reaction.

The invention claimed is:

1. A process for the preparation of polymer particles with optical anisotropy and shape anisotropy by dispersion polymerization, said process comprising:
   a) forming a solution comprising at least one reactive mesogen having a molecular structure providing non-covalent interactions in the polymer particles, at least one solvent, at least one initiator, optionally at least one surfactant, and optionally at least one co-monomer,
   b) polymerising the solution, and
   c) optionally separating, washing and/or drying the polymer particles.

2. The process according to claim 1, wherein said at least one reactive mesogen has a molecular structure providing π-interactions, hydrogen-bondings, and/or halogen-halogen interactions in the polymer particles.

3. The process according to claim 1, wherein said at least one reactive mesogen comprises at least one diphenylacetylene group.

4. The process according to claim 1, wherein said at least one reactive mesogen is a compound of Formula I

Wherein
P is a polymerizable group;
$Sp^1$ and $Sp^2$ are each independently of one another a spacer group;
L', L", and L''' are each independently of one another P-Sp-, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^0$, —NR$^{00}$R$^{000}$, —OH, —SF$_5$, optionally substituted silyl, aryl or heteroaryl with up to 12 atoms, or straight chain or branched alkyl, alkoxy, alkylcarbonyl, alkoxycarbonyl, alkylcarbonyloxy or alkoxycarbonyloxy with up to 12 atoms, wherein one or more H atoms are each optionally replaced by F or Cl;
Sp is a spacer group;
$R^1$ is H, alkyl with 1 to 12 C-atoms or O—$R^2$;
$R^2$ is H or alkyl with 1 to 12 C-atoms;
$R^0$, $R^{00}$, and $R^{000}$ are each independently of each other denote H or alkyl with 1 to 12 C-atoms; and
r', r", and r''' are each, independently of one another, 0, 1, 2, 3 or 4.

5. The process according to claim 1, wherein said at least one reactive mesogen is selected from compounds of Formulae II-V

Formula II

Formula III

Formula IV

Formula V

6. The process according to claim 1, wherein said solution contains said at least one co-monomer, and at least one co-monomer is selected from polymerizable dyes, reactive mesogens other than said at least one reactive mesogen, ionic co-monomers, and polymerizable stabilizers, wherein the co-monomers comprise one or more ethylenically unsaturated groups.

7. The process according to claim 1, wherein said polymerization is a thermal polymerisation.

8. The process according to claim 1, wherein said solution contains said at least one surfactant, and said surfactant is polyvinylpyrrolidone.

9. The process according to claim 1, wherein said solvent is a polar solvent and said polar solvent is selected from water, toluene, ethylene glycol, glycine, ethanol, 3-pentanol, and butanol.

10. Polymer particles prepared by a process according to claim 5.

11. An electrooptical, electronic electrochemical, electrophotographic, electrowetting and electrophoretic display and/or device comprising polymer particles according to claim 10.

12. A mono, bi or polychromal electrophoretic device comprising polymer particles according to claim 10.

13. An electrophoretic fluid comprising polymer particles according to claim 10.

14. An electrophoretic display device comprising an electrophoretic fluid according to claim 13.

15. The electrophoretic display device according to claim 14, wherein the electrophoretic fluid is applied by a technique selected from inkjet printing, slot die spraying, nozzle spraying, and flexographic printing.

16. The process according to claim 4, wherein L', L", and L''' are each independently of one another P-Sp-, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{0}$, —NR$^{00}$R$^{000}$, —OH, —SF$_5$, optionally substituted silyl, aryl or heteroaryl with up to 6 C atoms, or straight chain or branched alkyl, alkoxy, alkylcarbonyl, alkoxycarbonyl, alkylcarbonyloxy or alkoxycarbonyloxy with up to 6 C atoms, wherein one or more H atoms are each optionally replaced by F or Cl.

17. The process according to claim 4, wherein P in each case is selected from methacrylates, acrylates, methacrylamides, acrylamides, acrylonitriles, α-substituted acrylates, styrenes, vinyl, and substituted vinyl.

18. The process according to claim 4, wherein P in each case is a methacrylate or acrylate group.

19. The process according to claim 4, wherein Sp$^1$ is a group -(A-B)$_m$— wherein A is a linear or branched alkylene having 1 to 12 carbon atoms, B is O or S, and m is 0 to 5.

20. The process according to claim 19, wherein m is 1 to 3.

21. The process according to claim 4, wherein Sp$^2$ is —COO—, —OCO—, —CH$_2$CH$_2$—, —CF$_2$O—, —OCF$_2$—, —C≡C—, —CH=CH—, —OCO—CH=CH—, —CH=CH—COO—, or a single bond.

22. The process according to claim 4, wherein L', L", and L''' are each, independently of one another, selected from halogen, CN or optionally halogenated alkyl, alkoxy, alkylcarbonyl, alkoxycarbonyl, alkylcarbonyloxy or alkoxycarbonyloxy having up to 5 C atoms.

23. The process according to claim 4, wherein L', L", and L''' are each, independently of one another, selected from —F, —Cl, —CN or optionally halogenated alkyl having 1 to 5 C atoms.

24. The process according to claim 4, wherein R$^1$ is alkyl with 1 to 3 C-atoms or —O—R$^2$ wherein R$^2$ is alkyl with 1 to 3 C-atoms.

25. The process according to claim 4, wherein r', r", and r''' are each, independently of one another, 0 or 1.

26. The process according to claim 4, wherein P in each case is an acrylate or methacrylate group, Sp$^1$ is —(CH$_2$)$_n$—O— wherein n is 1-6, Sp$^2$ is —COO— or —C≡C—, L" is halogen, r" is 0 or 1, r' and r''' are each 0, and R$^1$ is —O—CH$_3$.

27. The electrophoretic display device according to claim 14, wherein the electrophoretic fluid is applied by a contact or contactless printing technique.

28. Polymer particles obtained by polymerization of at least one reactive mesogen selected from compounds of the following Formulae II-V:

Formula II

Formula III

Formula IV

-continued

Formula V

29. An electrophoretic fluid comprising polymer particles prepare according to the process of claim 1.

30. An electrophoretic display device comprising an electrophoretic fluid according to claim 29.

* * * * *